US006342899B1

(12) United States Patent
Feinstein et al.

(10) Patent No.: US 6,342,899 B1
(45) Date of Patent: Jan. 29, 2002

(54) METHOD AND SYSTEM OF DISPLAYING DATABASE CONTENTS IN ENVELOPE DATA FIELDS

(75) Inventors: David Feinstein, Milford; Victor Girardi, Oxford; Allen L. Kramer, Middletown, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/119,463

(22) Filed: Jul. 20, 1998

(51) Int. Cl.[7] .............................................. G06F 15/00

(52) U.S. Cl. ...................................................... 345/619

(58) Field of Search ................................ 345/433, 326, 345/418, 419, 618, 619

(56) References Cited

U.S. PATENT DOCUMENTS

| | | | | |
|---|---|---|---|---|
| 4,858,907 | A | 8/1989 | Eisner et al. | 271/124 |
| 4,875,174 | A | 10/1989 | Olodort et al. | 364/519 |
| 4,915,287 | A | 4/1990 | Volk et al. | 229/70 |
| 5,007,663 | A | 4/1991 | Moran | 283/81 |
| 5,146,439 | A | 9/1992 | Jachmann et al. | 369/25 |
| 5,175,691 | A | 12/1992 | Baker et al. | 364/478 |
| 5,278,947 | A | 1/1994 | Balga, Jr. et al. | 395/117 |
| 5,319,562 | A | 6/1994 | Whitehouse | 364/999.999 |
| 5,326,181 | A | 7/1994 | Eisner et al. | 400/104 |
| 5,387,783 | A | 2/1995 | Mihm et al. | 235/375 |
| 5,400,243 | A | 3/1995 | Oheda et al. | 364/999.999 |
| 5,448,685 | A | 9/1995 | Ogura et al. | 395/117 |
| 5,495,581 | A | 2/1996 | Tsai | 395/154 |
| 5,546,577 | A | 8/1996 | Marlin et al. | 395/600 |
| 5,583,970 | A | 12/1996 | Strobel | 395/114 |
| 5,606,609 | A | 2/1997 | Houser et al. | 380/4 |
| 5,621,864 | A | 4/1997 | Benade et al. | 395/117 |
| 5,652,884 | A | 7/1997 | Palevich | 395/712 |
| 5,657,431 | A | 8/1997 | Plakosh et al. | 395/115 |

(List continued on next page.)

FOREIGN PATENT DOCUMENTS

| | | | |
|---|---|---|---|
| DE | 9219115 | U1 | 5/1992 |
| EP | 0496575 | A2 | 1/1992 |
| EP | 0 603 095 | | 6/1994 |
| EP | 0780803 | A2 | 12/1996 |
| WO | WO 97/14117 | | 4/1997 |

OTHER PUBLICATIONS

"Escher Group Announces Universal Postal Client—Product to Replace Postage Meter Hardware with Internet Software Solution"; Oct. 1997; PR Newswire, p1006NEM049; DialogWeb copy pp. 1–3.

*Primary Examiner*—Phu K. Nguyen
(74) *Attorney, Agent, or Firm*—Brian A. Lemm; Michael E. Melton

(57) ABSTRACT

The invention is a method and system for establishing and printing a medium print field. The method begins with the initiation of a design software application which utilizes a display for representation of the medium and for displaying one or more component print fields on the medium representation. Each of the component print fields can be modified through utilization of a preferences input routine which further comprises: a printer selection option; a measurement scaling option; and, a return address selection option. The initiation further includes selection of a medium type and a set of characteristics for the medium. The representation displayed on the screen can be modified to the extent of its component print fields which comprise: a return address block; a postal indicia; a destination address block; and, a message block. Modifying the component print fields comprises selecting a database to attach to the selected field before assigning a first file from a related field of the database to the component print field. Once the field has been established, the system operator can begin scrolling through the viewable field by utilizing directional selection means to scroll from one file to another until selection of the component print field for modification has been made. An attachable component print field can also be selected. The method then confirms the modification and the attachment, to establish a finished print field for printing to the selected medium.

41 Claims, 7 Drawing Sheets

U.S. PATENT DOCUMENTS

| | | | | |
|---|---|---|---|---|
| 5,668,934 | A | 9/1997 | Maw | 395/110 |
| 5,668,964 | A | 9/1997 | Helsel et al. | 345/334 |
| 5,668,990 | A | 9/1997 | Bojorinas et al. | 395/615 |
| 5,680,615 | A | 10/1997 | Marlin et al. | 395/614 |
| 5,682,468 | A | 10/1997 | Fortenberry et al. | 395/119 |
| 5,684,934 | A | 11/1997 | Chen et al. | 395/113 |
| 5,689,703 | A | 11/1997 | Atkinson et al. | 395/614 |
| 5,694,563 | A | 12/1997 | Belfiore et al. | 395/340 |
| 5,706,458 | A | 1/1998 | Koppolu | 395/353 |
| 5,710,900 | A | 1/1998 | Anand et al. | 395/339 |
| 5,715,371 | A | 2/1998 | Ahamed et al. | 395/11 |
| 5,717,597 | A | 2/1998 | Kara | 364/999.999 |
| 5,719,776 | A | 2/1998 | Haug | 364/464.21 |
| 5,869,824 | A | 2/1999 | Okada et al. | 235/380 |
| 5,969,914 | A | 10/1999 | Nahaboo et al. | 395/333 |
| 6,030,132 | A | 2/2000 | Harman et al. | 400/62 |

METHOD AND SYSTEM OF DISPLAYING DATABASE CONTENTS IN ENVELOPE DATA FIELDS

RELATED APPLICATIONS

Reference is made to application Ser. No. 09/119,183, entitled A METHOD AND SYSTEM OF PRINT STREAM ADDRESS EXTRACTION, assigned to the assignee of this application and filed on even date herewith.

Reference is made to application Ser. No. 09/119,464, entitled A METHOD AND SYSTEM OF PRINTING POSTAGE INDICIA FROM AN ENVELOPE DESIGN APPLICATION, assigned to the assignee of this application and filed on even date herewith.

Reference is made to application Ser. No. 09/119,462, entitled A METHOD AND SYSTEM FOR CAPTURING DESTINATION ADDRESSES FROM LABEL DATA, assigned to the assignee of this application and filed on even date herewith.

BACKGROUND OF THE INVENTION

Graphics and design programs which allow a system user to create representations that can in turn be modified before printing are especially useful in creating finished documents. One such program is the Envelope Designer™ Plus graphics program from Pitney Bowes Inc. of Stamford, Conn. This program allows the user to create envelope and label designs that can be tailored to specific needs.

An envelope typically has two major design elements; these are the destination address block and the return address block. To these major elements, there can be added: a Postnet barcode; one or more message lines; and, one or more graphic images. The Envelope Designer™ Plus graphics program allows the system user to create the address, return address, attention line and message blocks, assign text attributes and position the blocks within a selected layout. The system user can also specify whether or not to include an optional Postnet™ bar code (Postnet is a trademark of the United States Postal Service). and its corresponding location on the envelope or label. The graphics program also allows the system operator to place a non-printing overlay on the envelope to ensure that the design and placement conforms to postal guidelines. The program can be further linked with the SmartMailer™ program from Pitney Bowes Inc. to attach address fields to the print field of the envelope or label. The resulting layout brings efficiency and cost benefit to the production of an envelope face; efficiency from the use of existing data and graphics files, and cost savings from the possible postal automation discounts that attach to certain categories of batch mailing and correctly zip-coded business mail.

The ability of an envelope/label designer program to be flexible, while giving its users the ability to link with databases that provide address files, is of great practical as well as commercial importance. The prior art has been limited in its ability to be flexible enough to be adapted to envelope/label design that can actually link with databases that are capable of being introduced to address hygiene routines.

Thus, it is an object of the present invention to overcome the limitations of the prior art by disclosing an envelope design program that is capable of linking with one or more databases for address sourcing. Additionally, it is a further object of the present invention to provide for a program that is capable of interfacing with address hygiene routines for performing address correction.

SUMMARY OF THE INVENTION

The limitations of the prior art are overcome by a method and system for establishing and printing a medium print field in a data processing system for manipulating data.

The method begins with the initiation of a medium (such as an envelope/label) design software application within the data processing system. The design application utilizes display means, such as a monitor, for displaying one of a plurality of user interface screens available from a set of user interface screens at a point in time. The step of displaying the screens comprises the further steps of displaying a representation of the medium on the display and displaying one or more fields from among the plurality of component print fields on the medium representation. Each of the component print fields can be modified by the design application through utilization of a preferences input routine. The preferences input routine further comprises: a printer selection option; a measurement scaling option; and, a default return address option. The measurement scaling option is utilized to adjust the medium's layout when visually displayed to a system operator. The system operator then selects a printer option and a measurement scaling option wherein the medium's layout can be adjusted when visually displayed to the system operator. The initiation further includes an opportunity for the system operator to select a medium tape and a set of characteristics for the medium.

Once the medium has been established as a representation on the display, the medium's return address can then be entered to the application or a default return address can be selected. The initiation of the design application additionally comprises the steps of selecting a format type from among a set of formats and assigning a set of measurements defining the selected format. The formats generally comprise an envelope format or a label format, wherein a customized set of measurements is assigned to the selected format.

The representation displayed on the screen to the system operator can be modified to the extent of its component print fields which are selected from among a plurality of component print fields. These fields comprise: a return address block; a postal indicia; a destination address block; and a message block. The modification of the component print fields begins with the selection of a component print field for modification, then selecting a database to attach to the selected component print field. A field of the database is then matched, or related, to the selected component print field before assigning a first file from the related field of the database to the component print field. Once the field has been established, the system operator can begin scrolling through the viewable component print field by utilizing directional selection means to scroll from the first assigned file to any subsequent assigned file. The scrolling continues until selection of the component print field for modification has been made.

Certain fields can be attached to the print field which are representative of component print fields. The system operator determines whether or not to attach an attachable component print field selected from among one or more attachable component print fields. The attachable component fields comprise a Postnet bar code and a graphic image.

The method then confirms the modification and the attachment, if any, to establish a finished print field. The finished print field is then printed to the selected medium. The confirmation comprises the further step of, saving to a memory as a file, the confirmed modifications together with the format type. The memory may be a component of the data processing system or may be remote to the data processing system.

The system disclosed herein comprises a data processing system further comprising a monitor for viewing screens generated by the software application. The system includes storage means for storing one or more data retrieval sites said data retrieval site is one of a group of data formats which includes: database format; spreadsheet file format; and formatted text.; and, the software application itself for envelope or label design and data file manipulation.

The system's internal data handling includes data retrieval site selection means for selecting, through the software application, a data retrieval site from among the set of one or more data retrieval sites. The data retrieval site is stored in table format and further comprises operator prompting means for prompting a system user for a specific table name contained in a field of one or more names; and selection means for selecting the specific table from the field of one or more names.

The system utilizes cycling means for cycling through the data retrieval site to locate a particular data file within the data retrieval means. The cycling means comprises selection means for selecting an appropriate Move command wherein the command is indicative of a location for placement of a selected data file and execution means for executing the Move command and placing the selected data file.

The selection of the data file is accomplished through selection means for selecting a data file from a set of one or more data files at the data retrieval site. Then, placement means are utilized for placing the selected data file in a desired location in a field for printing to the selected medium. The envelope printing field is defined in accordance with a definition profile which in turn comprises a set of selected data files wherein the selected data files contain data to be printed to the selected medium.

DETAILED DESCRIPTION OF THE PREFERRED EMBODIMENTS

Figure 1:
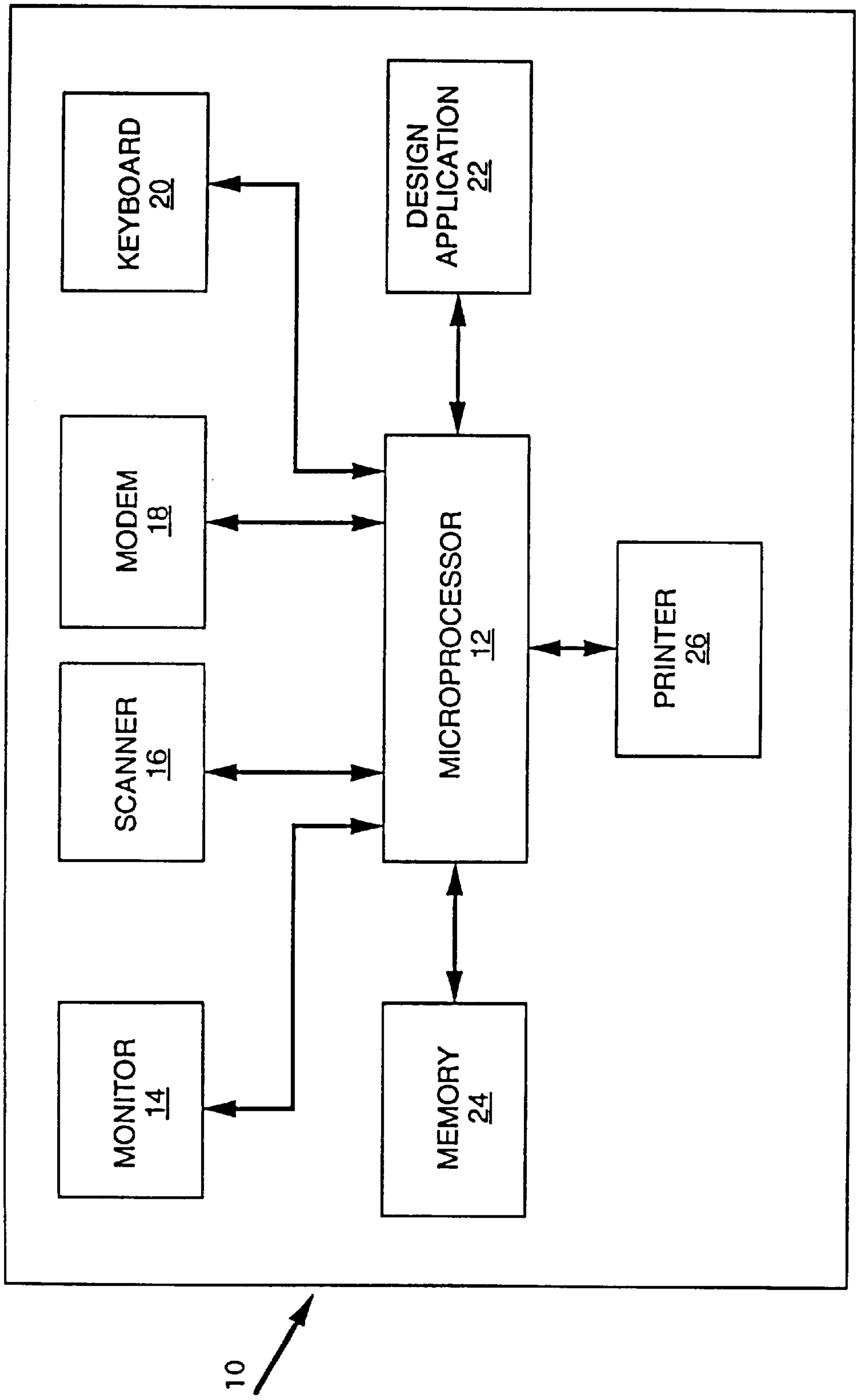
FIG. 1 is a block diagram of a system within which the method of the present invention could reside and be utilized.

Turning to FIG. 1, there is shown a block diagram of a system within which the method of the present invention could reside and be utilized.

System 10 comprises a microprocessor 12 interoperatively connected to monitor 14 for viewing the representation of the medium (such as an envelope or label) to be acted upon by the design application 22. The viewing of the media representation on monitor 14 promotes ease of use in selecting the various options available to the system user while formatting the medium, and provides an example of the human interface that can be brought to system 10. The monitor 14, under control of the design application 22, is able to show the system user: the medium representation; available menus from which option selections may be made; the medium's indicia; the amount of postage that will be incorporated into the indicia; and varied print fields available for printing to the selected medium. Microprocessor 12 is interoperatively connected to scanner 16. Scanner 16 provides system 10 with the ability to scan address field data, barcodes, or other scannable data sources as an input to design application 22. Printer 26 is also interoperatively connected to microprocessor 12 and serves as the output device by which the print fields are printed to the selected medium. Additionally, keyboard 20 is interoperatively connected to microprocessor 12 and serves as an input device for the input of data. Modem 18 gives system 10 the ability to communicate with other systems via communications means of varied types or to download print fields for remote storage; and, memory 24 allows the system to retain data for use in maintaining records or for storing data for future use.

Figure 2:
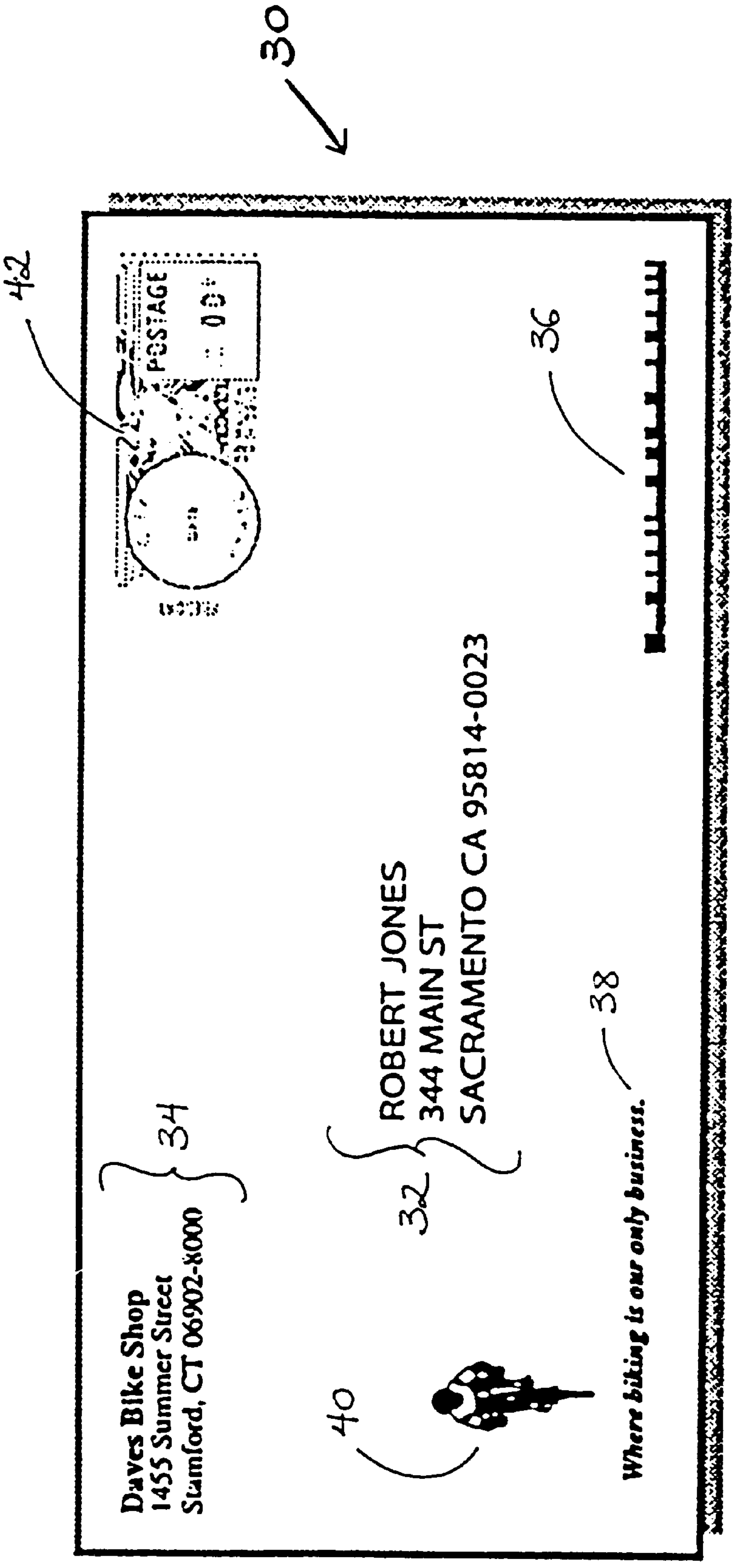
FIG. 2 is a drawing of the face of an envelope, and its component parts, which is representative of the medium that the subject invention is directed toward preparing.

Turning to FIG. 2 there is shown a drawing of the face of an envelope 30, and its component parts, which is representative of the medium that the subject invention is directed toward preparing.

Envelope 30 is shown comprising address block 32 which can be input by direct entry from the keyboard 20 or can be derived from access to a database introduced to the design application through the microprocessor 12 in connection with modem 18, or by accessing memory 24. The address indicated by the address block 32 can be subject to address hygiene routines prior to being saved within the print field represented by the face of envelope 30. Envelope 30 further comprises: return address block 34; Postnet barcode 36; single-line message 38; graphic image 40; and, indicia 42.

Figure 3:
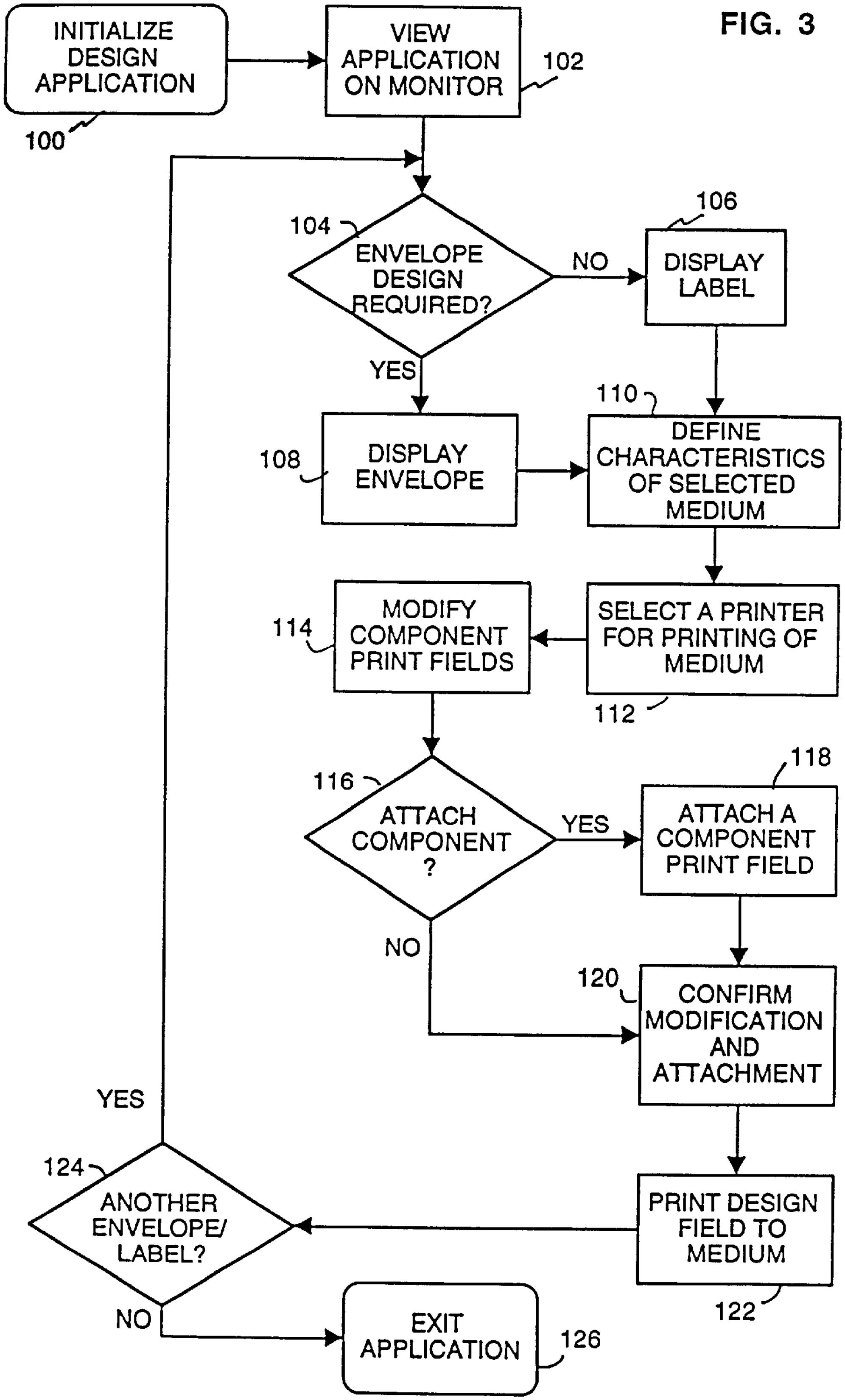
FIG. 3 is an upper level flowchart of the method of the present invention.

Bearing in mind the environment suggested by FIGS. 1 and 2, we now turn to FIG. 3 where there is shown an upper level flowchart of the method of the present invention.

FIG. 3 begins with the initialization of the design application at step 100. From step 100, the method advances to step 102 where the first of the application's user screens is displayed to the system user on a monitor. The user screens will present menus, lists, and queries to the system user as the application routines are utilized; this will provide the step-by-step building of the medium print field for printing.

The system and method will guide the system user in the selection of a medium format beginning with the query at step 104. At step 104, the method queries as to whether or not an envelope design routine is required. If the response to the query is "NO," then the method displays a label routine for the system operator at step 106. Step 106 advances to step 110 where the characteristics of the selected medium are defined. If the response to the query at step 104 is "YES," however, then the method displays an envelope routine for the system operator at step 108. Step 108 advances to step 110 where the characteristics of the selected medium are defined.

The method advances from step 110 to step 112 where the selection of a printer type is made. Printer characteristics may limit the characteristics available for designing the envelope or label media. The face of the envelope or label to be designed through the application is the print field for that medium. The print field is in turn comprised of component print field that, taken together, form the print field. From step 112, the method advances to step 114 where the component print fields can be modified. After modification, the method queries, at step 116, as to whether or not a component such as graphics, Postnet barcodes, postal indicia, or single-line messages are to be attached at the request of the system operator. If the response to the query is "YES," then the method advances to step 118 where the appropriate component is attached to the print field. From step 118, the method advances to step 120 where confirmation of the modification and attachment, if any, is made. If, however, the response to the query, at step 116, is "NO," then the method advances directly to step 120.

The modification, together with any attachments, define the design field to be printed to the medium. From step 120, the method advances to step 122 where the design field is printed to the medium. The method then queries, at step 124, as to whether or not another envelope or label is to be prepared. If the response to the query is "YES," then the method returns to enter the method flow at step 104. If the response to the query is "NO," however, then the method concludes its flow and the application is exited at step 126.

Figure 4A:
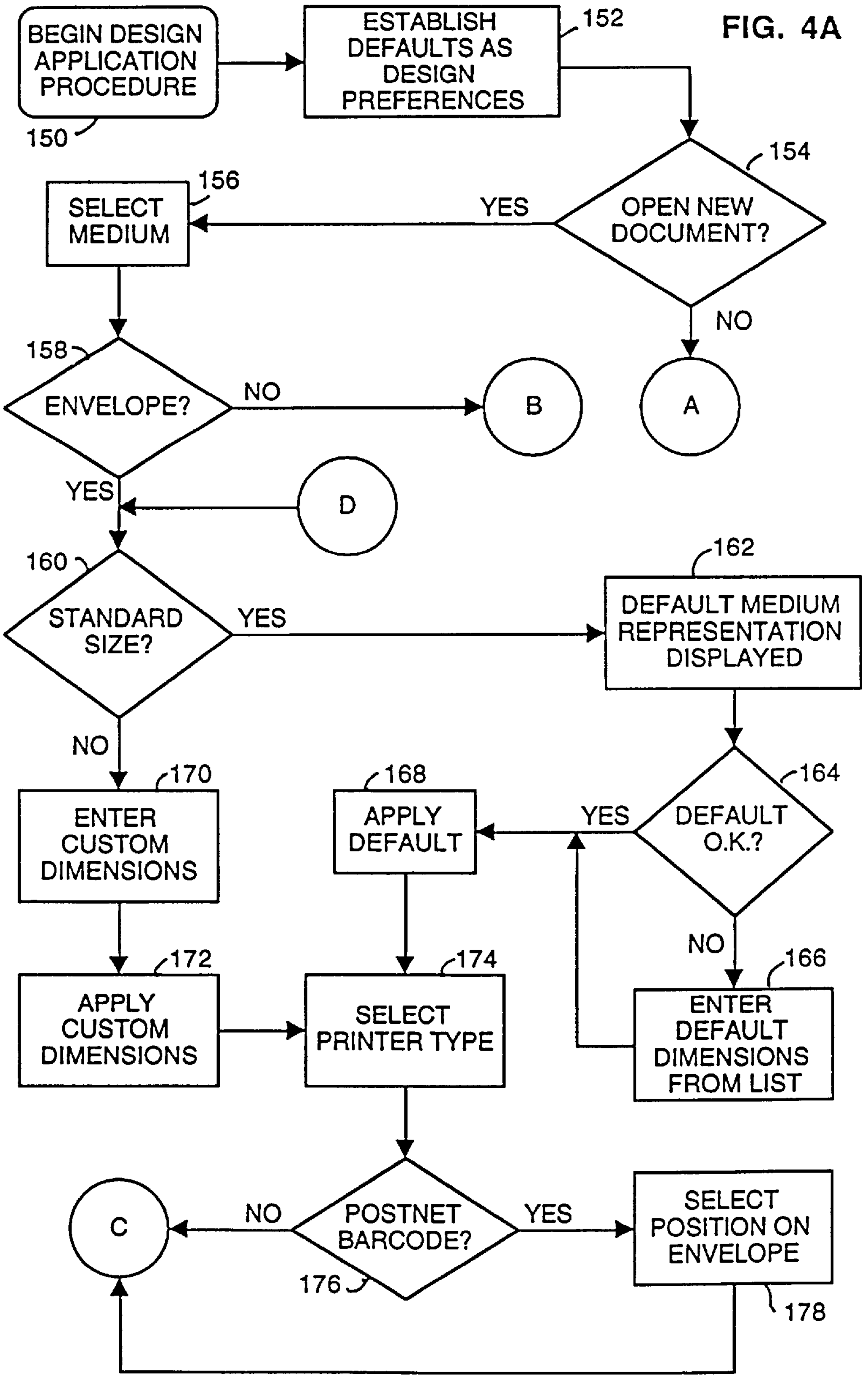
FIG. 4A is a detailed flowchart of the method of the present invention wherein the design application is initiated and then presents a flow path that concludes with the saving of the print field.

Turning to FIG. 4A, there is shown a detailed flow of the method as it occurs in a preferred embodiment of the claimed invention.

The flow begins at step 150 with the initiation of the design procedure. From step 150, the method advances to step 152 where the establishment of default design preferences is made. Preferences are selected from the application's Preferences routine as selected from the Edit menu. The system operator can select from a listing of printers for printing of the selected medium. Additionally, the program scale can be selected as well as an envelope or label description and a default return address. The scale can be directed to inches or millimeters. The method then advances to a query at step 154.

Figure 4B:
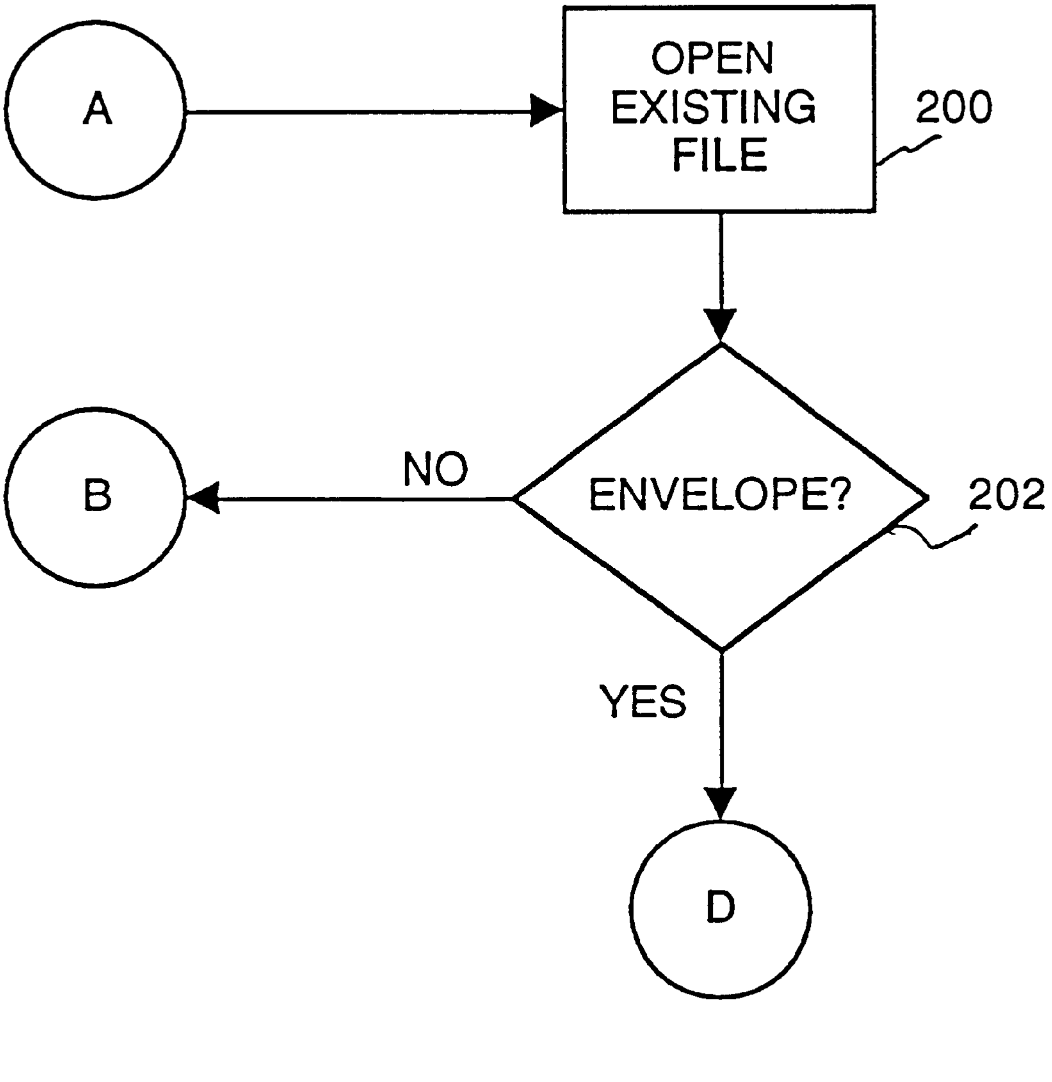
FIG. 4B is a continuation of the detailed flowchart of FIG. 4A.

At step 154, the method queries as to whether or not a new document is to be opened. If the response to the query is "NO," then the method advances along path A to re-enter the method flow at step 200 as is shown in FIG. 4B. If a new document is to be opened, then the response to the query at step 154 should be "YES," and the method will advance on to step 156 where the medium (envelope or label) is selected. The method queries, at step 158, as to the medium choice.

Figure 4C:
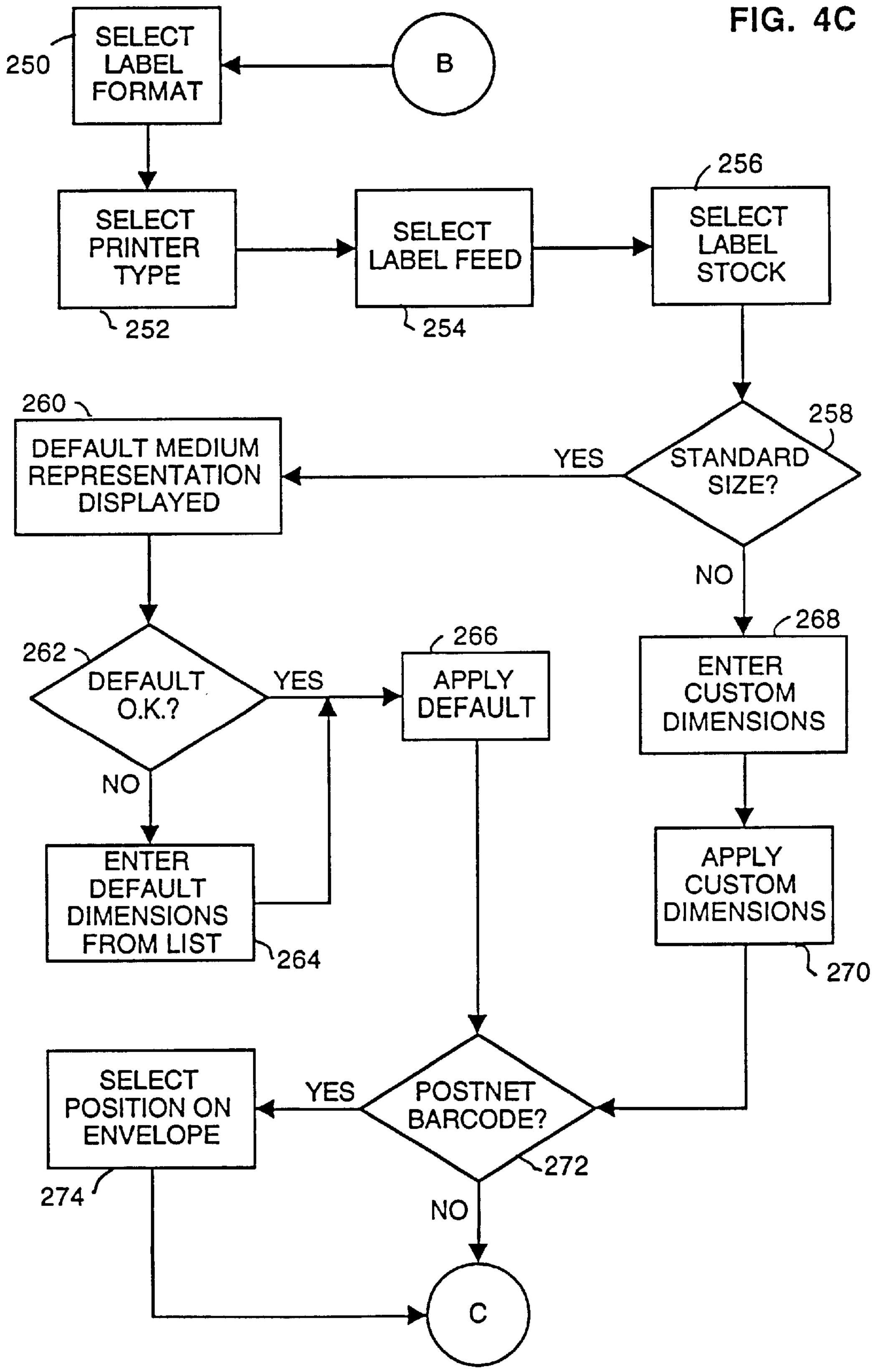
FIG. 4C is a continuation of the detailed flowcharts of FIGS. 4A and 4B.

The design path will shift depending upon the medium selected for action. Labels can take on differing print characteristics from those of envelopes and therefore must be accounted for in a different fashion. At step 158, the method queries as to whether or not an envelope has been selected. If the response to the query is "NO," then the method advances along path B to re-enter the method flow at step 250 as is shown in FIG. 4C. However, if the response to the query at step 158 is "YES," then the method advances to the query at step 160.

When a document file is created, the program will ask the system operator to accept or reject the default envelope displayed on the system monitor. This acceptance or rejection is represented by the query at step 1610 which queries as to whether or not a standard size field is required. If the response to the query is "YES," then the method advances to step 162 where the default medium is represented to the system user in the system display before advancing to the query at step 164. At step 164, the method queries as to whether or not the default parameters are acceptable for the action desired. If the response to the query is "NO," then the method advances to step 166 where default dimensions are selected from a list of standard settings before advancing to step 168. If the response to the query at step 164 is"YES," then the method advances directly to step 168.

At step 168, the default parameters are applied to the application and the representation of the medium in the display is shifted accordingly. The printer type is then selected at step 174.

Returning to step 160, if the response to the query is "NO," then the method requires that custom dimensions be selected. To specify a custom size, the dimensions are entered, at step 170, in the appropriate field of the application in inches or millimeters depending upon the preferences established in step 152. The method then advances to step 172 where the custom dimensions are applied to the application and the representation of the medium in the display is shifted accordingly. The printer type is then selected at step 174.

Figure 4D:
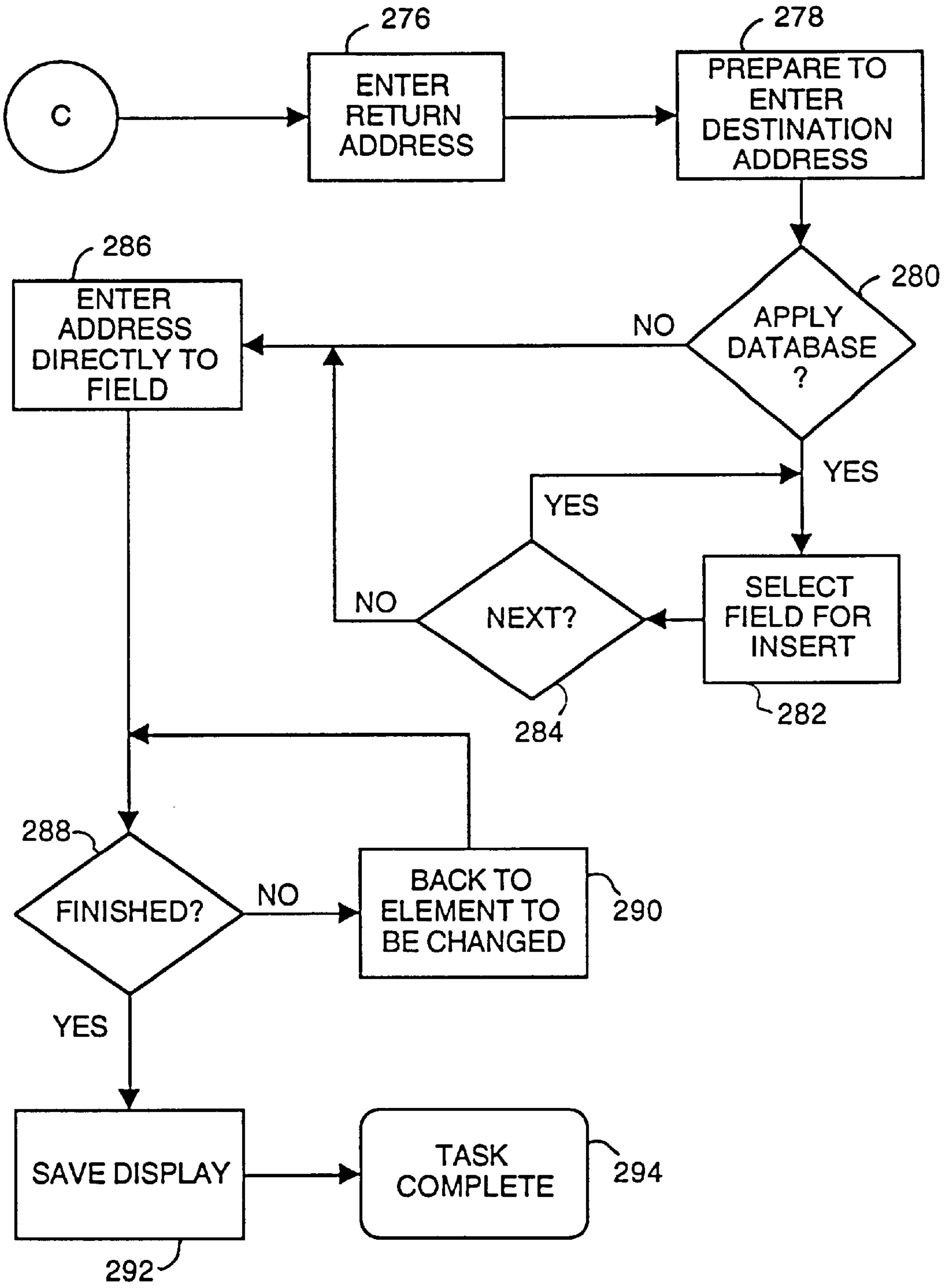
FIG. 4D is a continuation and conclusion of the flowcharts of FIGS. 4A, 4B, and 4C.

From step 174, the method advances to a query at step 176. At step 176, the method queries as to whether or not a Postnet barcode is to be applied to the print field. If the response to the query is "NO," then the method advances along path C to re-enter the method flow at step 276 as is shown in FIG. 4D; otherwise, if the response is "YES," then the method advances to step 178 where the positioning of the barcode on the envelope is determined before advancing along path C.

Turning to FIG. 4B, there is shown path A which originated in FIG. 4A, re-entering the system flow at step 200 where an existing file is opened for action. The method advances from step 200 to step 202. At step 202, the method queries as to whether or not the medium of the existing file is an envelope. If the response to the query is "NO," then the method advances along path B to reenter the method flow at step 250 as is shown in FIG. 4C. If, however, the response to the query at step 202 is "YES," then the method advances along path D to re-enter the system flow at step 160 as is shown in FIG. 4A.

Turning to FIG. 4C, there is shown path B re-entering the system flow at step 250 where the label format is selected. Upon choosing the label format, the method advances to step 252 where the printer type is selected by the system itself. In establishing the label routines, the method prompts the system user at step 254 to select a label feed type. In a preferred embodiment of the invention, the label feed type choices are either continuous or sheet feed. The method then advances to step 256 where the label stock is selected. The choice of stock can be either standard or custom.

When the document file for a label design is established, the method requires the determination of the label stock; this is accomplished at step 258 which queries as to whether or not a standard size field is required. If the response to the query is "YES," then the method advances to step 260 where the default medium is represented to the system user in the system display before advancing to the query at step 262. At step 262, the method queries as to whether or not the default parameters are acceptable for the action desired. If the response to the query is "NO," then the method advances to step 264 where default dimensions are selected from a list of standard settings before advancing to step 266. If the response to the query at step 262 is"YES," then the method advances directly to step 266.

At step 266, the default parameters are applied to the application and the representation of the medium in the display is shifted accordingly before advancing to the query at step 272 to determine the need for a Postnet barcode.

Returning to step 258, if the response to the query is "NO," then the method requires that custom dimensions be selected. To specify a custom size, the dimensions are entered, at step 268, in the appropriate field of the application in inches or millimeters depending upon the preferences established in step 152. The method then advances to step 270 where the custom dimensions are applied to the application and the representation of the medium in the display is shifted accordingly before advancing to the query at step 272 to determine the need for a Postnet barcode.

At step 272, the method queries as to whether or not a Postnet barcode is to be applied to the print field. If the response to the query is "NO," then the method advances along path C to re-enter the method flow at step 276 as is shown in FIG. 4D; otherwise, if the response is "YES," then the method advances to step 274 where the positioning of the barcode on the envelope is determined before advancing along path C.

Turning to FIG. 4D, there is shown path C re-entering the method flow at step 276. At step 276 the return address is entered into the print field and the method then advances to step 278 where the destination address field is prepared for acceptance of a destination address. The destination address can be entered into the print field directly by the system operator utilizing a keyboard, or can be entered by applying a database or data retrieval site and scrolling through the database or data retrieval site until an address is selected. A field of the database or data retrieval site is then matched, or related, to the selected component print field before assigning a first file from the related field of the database or data retrieval site to the component print field. Once the field has been established, the system operator can begin scrolling through the viewable component print field by utilizing directional selection means to scroll from the first assigned file to any subsequent assigned file. The scrolling continues until selection of the component print field for modification has been made.

The system utilizes cycling means for cycling through the data retrieval site to locate a particular data file within the data retrieval means. The cycling means comprises selection means for selecting an appropriate Move command wherein the command is indicative of a location for placement of a selected data file and execution means for executing the Move command and placing the selected data file.

The selection of the data file is accomplished through selection means for selecting a data file from a set of one or more data files at the database or data retrieval site. Then, placement means are utilized for placing the selected data file in a desired location in a field for printing to the selected medium. The envelope printing field is defined in accordance with a definition profile which in turn comprises a set of selected data files wherein the selected data files contain data to be printed to the selected medium.

Once the address destination field has been prepared, the method advances to a query at step 280 which queries as to whether or not a database or data retrieval site is to be applied to the field. If the response to the query is "NO," then the method advances to step 286 where the destination address is entered directly into the component field by the system operator. If, however, the response to the query at step 280 is "YES," then the possible destination addresses within a database or data retrieval site are selected by cycling through the databases available to be applied and then selecting, at step 282, an appropriate field for application. The design application will insert the selected field in place of the address in the envelope or label design as selected.

After the field has been selected for insertion into the destination address field, the method advances to a query at step 284 which inquires as to whether or not there is a next address to be applied. This query is of particular importance if there are multiple destinations to be printed of a particular design type. If the response to the query is "YES," then the method returns to step 282 for selection of another address to be applied to a subsequent envelope. If the response to the query at step 284 is "NO," then the method advances to step 2816 where the address is entered directly into the field for printing.

The method advances from step 286 to a query at step 288. At step 283, the method queries as to whether or not the print field design sequence has been completed. If the response to the query is "NO," then the method advances to step 290 where the system operator can return the method flow back to any element of the design print field that needs to be altered or modified. If the response to the query at step 288 is "YES," then the design is saved to memory, at step 292, for future use or for linking with an indicia control. The design task is then completed at step 294.

While certain embodiments have been described above in terms of the system within which the address object methods may reside, the invention is not limited to such a context. The system shown in FIG. 1 is an example of a host system for the invention, and the system elements are intended merely to exemplify the type of peripherals and software components that can be used with the invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of establishing and printing a medium print field in a data processing system, said method comprising the steps of:

(a) initiating a design application within said data processing system;

(b) selecting a medium type and a set of characteristics of said medium;

(c) displaying a representation of said medium type on a display;

(d) displaying at least one component print field on said representation, said at least one component print field being modifiable;

(e) selecting a printer type for printing said medium print field;

(f) modifying one or more component print;

(g) determining whether or not to attach an attachable component print field selected from among one or more attachable component print fields;

(h) confirming said modification and said attachment, if any, to establish a finished print field; and (i) printing said finished print field to said medium.

2. The method of claim 1, wherein said design application comprises a preferences input routine and wherein said preferences input routine further comprises:

(a) a printer selection option;

(b) a measurement scaling option wherein said measurement scaling option is utilized to adjust a layout of said medium type when visually displayed to a system operator; and (c) a default return address option.

3. The method of claim 1, wherein said design application initiation comprises the further steps of:

(a) selecting a format type from among a set of formats; and (b) assigning a set of measurements defining said selected format.

4. The method of claim 3, wherein said set of formats comprises an envelope format.

5. The method of claim 3, wherein said set of formats comprises a label format.

6. The method of claim 3, wherein a customized set of measurements is assigned to said selected format.

7. The method of claim 1, wherein said medium comprises an envelope.

8. The method of claim 1, wherein said medium comprises a label.

9. The method of claim 1, wherein said plurality of component print fields comprises:

(a) a return address block;

(b) a postal indicia;

(c) a destination address block; and (d) a message block.

10. The method of claim 1, wherein said confirmation comprises the further step of saving to a memory as a file said confirmed modifications together with said format type.

11. The method of claim 10, wherein said memory is a component of said data processing system.

12. The method of claim 10, wherein said memory is remote to said data processing system.

13. The method of claim 1, wherein said one or more attachable component fields comprises:

(a) a Postnet bar code; and (b) a graphic image.

14. The method of claim 1, wherein said modification of said component print fields further comprises the steps of:

(a) selecting a component print field for modification;

(b) selecting a database to attach to said selected component print field;

(c) relating a field of said database to said selected component print field;

(d) viewing on said display means said component print field;

(e) assigning a first file from said related field of said database to said component print field;

(f) scrolling through said viewable component print field whereby said system operator utilizes directional selection means to scroll from said first assigned file to a subsequent assigned file and continuing said scrolling until selection of said component print field for modification has been made; and (g) making said modification.

15. A system for establishing, displaying, and printing data fields on a medium, comprising:

(a) a data processing system for manipulating data;

(b) a design application within said data processing system;

(c) first selection means for selecting a medium type and a set of characteristics of said medium;

(d) display means for displaying a representation of said medium type, said representation including at least one modifiable component print field;

(e) second selection means for selecting a printer type for printing said medium print field;

(f) first data entry means for modifying one or more component print fields;

(g) determining means for determining whether or not to attach an attachable component print field selected from among one or more attachable component print fields;

(h) second data entry means for confirming said modification and said attachment, if any, to establish a finished print field; and (i) printer means for printing said finished print field to said medium.

16. The system of claim 15, wherein said design application comprises a preferences input routine and wherein said preferences input routine further comprises:

(a) a printer selection option;

(b) a measurement scaling option wherein said measurement scaling option is utilized to adjust said envelope's layout when visually displayed to a system operator; and (c) a default return address option.

17. The system of claim 15, wherein said design application initiation further comprises:

(a) selection means for selecting a format type from among a set of formats; and (b) assignment means for assigning a set of measurements defining said selected format.

18. The system of claim 17, wherein said set of formats comprises an envelope format.

19. The system of claim 17, wherein said set of formats comprises a label format.

20. The system of claim 17, wherein said selected format comprises a customized set of measurements.

21. The system of claim 15, wherein said medium comprises an envelope.

22. The system of claim 15, wherein said medium comprises a label.

23. The system of claim 15, wherein said plurality of component print fields; comprises:

(a) a return address block;

(b) a postal indicia;

(c) a destination address block; and (d) a message block.

24. The system of claim 15, further comprising a memory interoperatively connected with said data processing system for saving to a memory as a file said finished print field.

25. The system of claim 24, wherein said memory is a component of said data processing system.

26. The system of claim 24, wherein said memory is remote to said data processing system.

27. The system of claim 15, wherein said one or more attachable component fields comprises:

(a) a Postnet bar code; and (b) a graphic image.

28. A method of printing data to an envelope comprising the steps of:

(a) selecting a data retrieval site from among a set of one or more data retrieval sites;

(b) cycling through said data retrieval site;

(c) selecting a data file from a set of one or more data files at said data retrieval site;

(d) placing said selected data file in a desired location in a field for printing to said envelope; and (e) printing said selected data to said desired field on said envelope.

29. The method of claim 28, wherein said data retrieval site is one of a group of data formats which includes: database format; spreadsheet file format; and formatted text.

30. The method of claim 28, wherein said data retrieval site cycling comprises the further steps of:

(a) selecting an appropriate Move command wherein said command is indicative of a location for placement of a selected data file;

(b) executing said move command and placing said selected data file; and (c) repeating said command selection and associated command execution until a desired print field has been established.

31. The method of claim 28, wherein said data retrieval site is stored in table format, said method further comprising the steps of:

(a) prompting a system user for a specific table name contained in a field of one or more names; and (b) selecting said specific table from said field of one or more names.

32. The method of claim 28, further comprising the steps of:

(a) entering said data retrieval site;

(b) reading one or more of said data files;

(c) selecting one of said data files;

(d) utilizing said selected data file as a placeholder for data to be printed in a particular field of said envelope; and (e) positioning said selected data file in accordance with a desired field location.

33. The method of claim 28, wherein said envelope printing field is defined in accordance with a definition profile.

34. The method of claim 33, wherein said definition profile comprises a set of selected data files wherein said selected data files contain data to be printed to said envelope.

35. A system for printing data to an envelope comprising:

(a) a data processing system further comprising:

(i) storage means for storing one or more data retrieval sites; and (ii) a software application for envelope design and data file manipulation;

(b) data retrieval site selection means for selecting through said software application a data retrieval site from among said set of one or more data retrieval sites;

(c) cycling means for cycling through said data retrieval site to locate a particular data file within said data retrieval means;

(d) selection means for selecting a data file from a set of one or more data files at said data retrieval site;

(e) placement means for placing said selected data file in a desired location in a field for printing to said envelope; and (f) printing means for printing said selected data to said desired field on said envelope.

36. The system of claim 35, wherein said data retrieval site is one of a group of data formats which includes: database format; spreadsheet file format; and formatted text.

37. The system of claim 35, wherein said cycling means comprises:

(a) selection means for selecting an appropriate Move command wherein said command is indicative of a location for placement of a selected data file; and (b) execution means for executing said move command and placing said selected data file.

38. The system of claim 35, wherein said data retrieval site is stored in table format, said system further comprising:

(a) operator prompting means for prompting a system user for a specific table name contained in a field of one or more names; and (b) selection means for selecting said specific table from said field of one or more names.

39. The system of claim 35, wherein said data processing system further comprises a monitor for viewing screens generated by said software application.

40. The system of claim 35, wherein said envelope printing field is defined in accordance with a definition profile.

41. The system of claim 35, wherein said definition profile comprises a set of selected data files wherein said selected data files contain data to be printed to said envelope.

* * * * *